(12) United States Patent
Tadano et al.

(10) Patent No.: US 10,230,874 B2
(45) Date of Patent: Mar. 12, 2019

(54) IMAGING DEVICE AND IMAGING CONTROL METHOD

(71) Applicants: Sony Corporation, Tokyo (JP); William Marsh Rice University, Houston, TX (US)

(72) Inventors: Ryuichi Tadano, Kanagawa (JP); Adithya Pediredla, Houston, TX (US); Ashok Veeraraghavan, Houston, TX (US)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 15/133,496

(22) Filed: Apr. 20, 2016

(65) Prior Publication Data

US 2016/0316112 A1 Oct. 27, 2016

Related U.S. Application Data

(60) Provisional application No. 62/150,601, filed on Apr. 21, 2015.

(51) Int. Cl.
| | |
|---|---|
| *G01S 17/10* | (2006.01) |
| *G01S 17/32* | (2006.01) |
| *G01S 17/89* | (2006.01) |
| *H04N 5/222* | (2006.01) |

(52) U.S. Cl.
CPC ......... *H04N 5/2226* (2013.01); *G01S 17/107* (2013.01); *G01S 17/32* (2013.01); *G01S 17/89* (2013.01)

(58) Field of Classification Search
CPC .................................................... H04N 5/2226
USPC ........................................................ 348/135
See application file for complete search history.

(56) References Cited

U.S. PATENT DOCUMENTS

2011/0295562 A1* 12/2011 Mehta ................... G01S 7/4915
                                                          702/189
2015/0304534 A1* 10/2015 Kadambi ............. H04N 5/2256
                                                          348/207.11

FOREIGN PATENT DOCUMENTS

JP         06-236497 A         8/1994

* cited by examiner

*Primary Examiner* — On S Mung
(74) *Attorney, Agent, or Firm* — Wolf, Greenfield & Sacks, P.C.

(57) ABSTRACT

An imaging device includes: a control unit configured to control an output of an irradiation signal including an irradiation code used for control of a pattern of emission of irradiation light and an output of a reference signal including a reference code indicating a pattern used for detection of a correlation with reception light including reflection light of the irradiation light; and an imaging element configured to output a pixel signal indicating a correlation between the reception light and the reference signal, wherein one of the irradiation code and the reference code is a code in which weighted adding of a plurality of unit codes, in which a phase of a basic code having an impulse cross-correlation with the other code is shifted for a different shift amount, is performed.

15 Claims, 10 Drawing Sheets

IMAGING DEVICE AND IMAGING CONTROL METHOD

RELATED APPLICATIONS

This Application claims priority under 35 U.S.C. § 119(e) to U.S. Provisional Application Ser. No. 62/150,601, entitled "DEPTH SELECTIVE CAMERA" filed on Apr. 21, 2015, which is herein incorporated by reference in its entirety.

TECHNICAL FIELD

The present technology relates to an imaging device and an imaging control method and specifically relates to an imaging device and an imaging control method using a time of flight (ToF) method.

BACKGROUND ART

In a related art, a technology of transmitting a transmission signal modulated by a predetermined PN code in a predetermined direction from a vehicle identification device, of acquiring a correlation with a signal received from a vehicle by using a code in which a PN code is delayed for the predetermined number of bits, and of making it possible to acquire vehicle information of a plurality of vehicles at different distances in the above direction has been proposed (see, for example, PTL 1).

CITATION LIST

Patent Literature

PTL 1
Japanese Patent Application Laid-Open No. 6-236497

SUMMARY

Technical Problem

However, in PTL 1, it is not considered to acquire an image or a range image in a range at an arbitrary distance. Here, the range image is an image including a range pixel signal that is based on a distance in a depth direction to an object from an imaging device, the distance being detected for each pixel.

The present technology is provided in view of the forgoing and is to make it possible to acquire an image or a range image in a range at an arbitrary distance.

Solution to Problem

An imaging device of an aspect of the present technology includes: a control unit configured to control an output of an irradiation signal including an irradiation code used for control of a pattern of emission of irradiation light and an output of a reference signal including a reference code indicating a pattern used for detection of a correlation with reception light including reflection light of the irradiation light; and an imaging element configured to output a pixel signal indicating a correlation between the reception light and the reference signal, wherein one of the irradiation code and the reference code is a code in which weighted adding of a plurality of unit codes, in which a phase of a basic code having an impulse cross-correlation with the other code is shifted for a different shift amount, is performed.

The one code can be a code in which the plurality of unit codes having a phase difference with equal intervals is added with the same weight.

The control unit can control a range of a phase of the plurality of unit codes.

A signal processing unit configured to generate a range pixel signal, which is based on a distance to an object, for each pixel based on the pixel signal can be further included, wherein the control unit can output, as the one code, a first superimposed code that is the plurality of unit codes which has a phase difference with equal intervals and which is added with weight decreased in a linear shape and a second superimposed code that is the plurality of unit codes added with weight increased in a linear shape, and the signal processing unit can generate the range pixel signal based on a ratio of the pixel signal with respect to the first superimposed code and the pixel signal with respect to the second superimposed code.

The control unit can control a range of a phase of the plurality of unit codes.

The one code can be a code that is a first unit code which is a basic code with a phase shifted for a first shift amount and to which a second unit code, which is a first unit code with a phase shifted for a second shift amount, is added with negative-weight.

The control unit can add the second unit code with the negative-weight to the first unit code by adding a code that is a bit-inverted second unit code to the first unit code along with positive-weight having the same absolute value with the negative-weight.

The control unit can control the first shift amount and the second shift amount.

The one code can be a code in which a first superimposed code that is a plurality of first unit codes which has a phase difference with equal intervals and which is added with positive-weight increased in a linear shape and a second superimposed code that is a plurality of second unit codes in which phases of the plurality of first unit codes are shifted for the same shift amount and which is added with negative-weight decreased in a linear shape are superimposed.

The control unit can generate the second superimposed code by adding codes, which are a plurality of bit-inverted second unit codes, with positive-weight having the same absolute value with the negative-weight.

The control unit can control a range of a phase of the first unit codes and a shift amount of a phase between the first unit codes and the second unit codes.

The basic code can be identical to the other code.

The irradiation code and the reference code can include M-sequences having the same value.

The one code can be a code in which weighted adding is performed by lining up of the plurality of unit codes in a time direction.

A lighting unit configured to emit the irradiation light can be further provided.

An imaging control method of an aspect of the present technology includes: controlling an output of an irradiation signal including an irradiation code used for control of a pattern of emission of irradiation light and an output of a reference signal including a reference code indicating a pattern used for detection of a correlation with reception light including reflection light of the irradiation light; outputting a pixel signal indicating a correlation between the reception light and the reference signal; and using, as one of the irradiation code and the reference code, a code in which weighted adding of a plurality of unit codes, in which a phase of a basic code having an impulse cross-correlation with the other code is shifted for a different shift amount, is performed.

In an aspect of the present technology, an output of an irradiation signal including an irradiation code used for control of a pattern of emission of irradiation light and an output of a reference signal including a reference code indicating a pattern used for detection of a correlation with reception light including reflection light of the irradiation light are controlled, a pixel signal indicating a correlation between the reception light and the reference signal is output, and a code in which weighted adding of a plurality of unit codes, in which a phase of a basic code having an impulse cross-correlation with the other code is shifted for a different shift amount, is performed is used as one of the irradiation code and the reference code.

Advantageous Effects of Invention

According to an aspect of the present technology, it is possible to acquire an image or a range image in a range at an arbitrary distance.

Note that an effect described in the present description is just an example and an effect of the present technology is not limited to the effect described in the present description. There may be an additional effect.

BRIEF DESCRIPTION OF DRAWINGS

Each of FIG. 8A

Each of FIG. 9A

DESCRIPTION OF EMBODIMENTS

In the following, a mode to carry out the present technology (hereinafter, referred to as embodiment) will be described.

Note that the description will be made in the following order.
1. Embodiment
2. Modification example
3. Usage example of imaging device

1. EMBODIMENT

{Configuration Example of Imaging Device 11}

Figure 1:
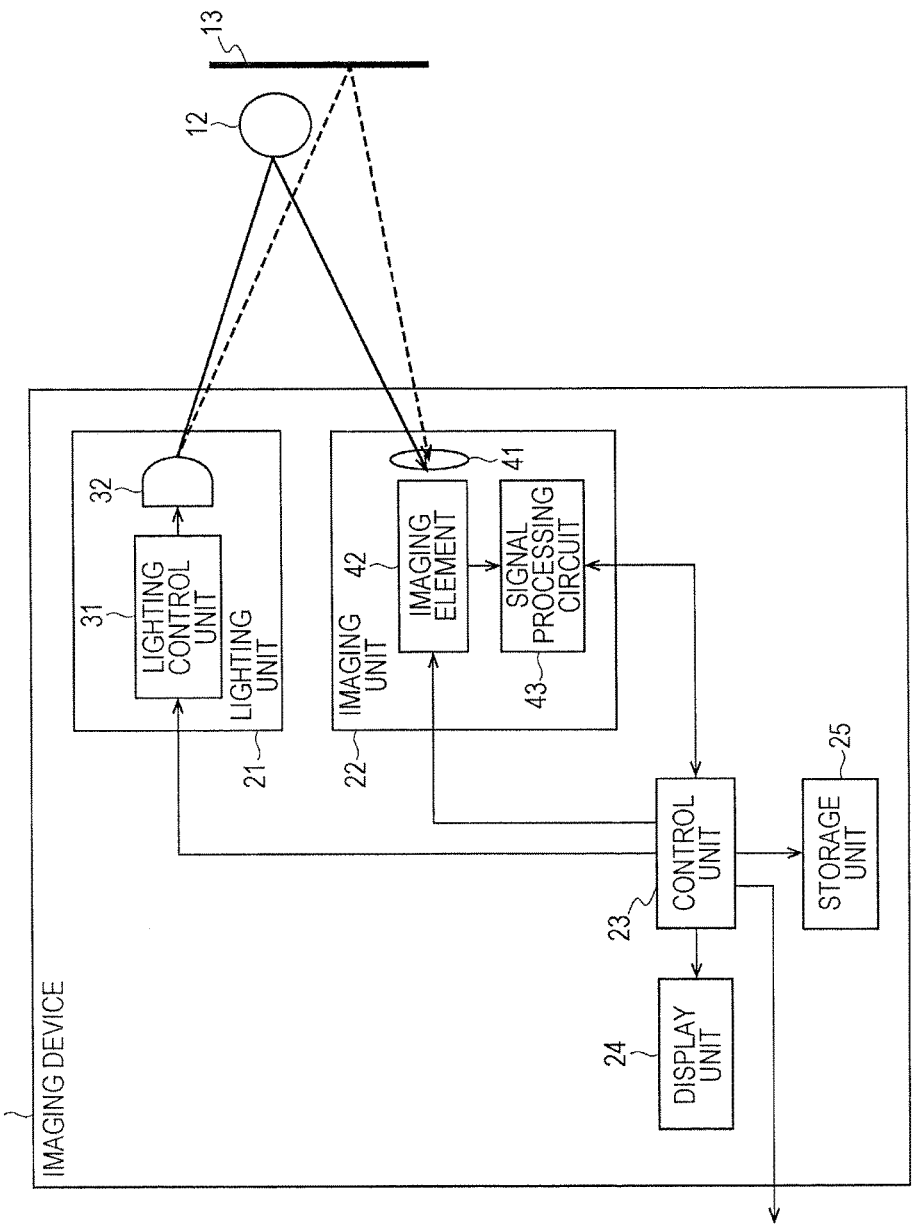
FIG. 1 is a block diagram illustrating a configuration example of an imaging device to which the present technology is applied.

FIG. 1 is a block diagram illustrating an embodiment of an imaging device to which the present technology is applied.

An imaging device 11 is, for example, a device for photographing of an image or a range image by using a ToF method. Note that in the following, a normal monochrome or colored image will be referred to as a normal image when being distinguished from a range image.

The imaging device 11 includes a lighting unit 21, an imaging unit 22, a control unit 23, a display unit 24, and a storage unit 25.

The lighting unit 21 includes a lighting control unit 31 and a light source 32.

Under control by the control unit 23, the lighting control unit 31 controls a pattern of emission of irradiation light performed by the light source 32. More specifically, according to an irradiation code included in an irradiation signal supplied by the control unit 23, the lighting control unit 31 controls a pattern of transmission of irradiation light performed by the light source 32. For example, the irradiation code includes two values which are 1 (High) and 0 (Low). The lighting control unit 31 turns on the light source 32 when a value of the irradiation code is 1 and the lighting control unit 31 turns off the light source 32 when a value of the irradiation code is 0. Note that a function indicating the irradiation code will be referred to as g(t) in the following.

Under control by the lighting control unit 31, the light source 32 emits light (irradiation light) in a predetermined wavelength band. The light source 32 includes, for example, an infrared laser diode. Note that a kind of the light source 32 and a wavelength band of the irradiation light can be set arbitrarily according to a usage or the like of the imaging device 11.

The imaging unit 22 includes a lens 41, an imaging element 42, and a signal processing circuit 43.

The lens 41 forms an image of incident light on an imaging surface of the imaging element 42. Note that a configuration of the lens 41 is arbitrary and the lens 41 may include a plurality of lens groups.

The imaging element 42 includes, for example, a complementary metal oxide semiconductor (CMOS) image sensor using a ToF method. The imaging element 42 performs imaging of an object 12, an object 13, and the like under control by the control unit 23 and supplies an acquired pixel signal to the signal processing circuit 43. More specifically, the imaging element 42 generates a pixel signal indicating a correlation between a reference signal supplied by the control unit 23 and reception light including reflection light which is irradiation light emitted from the light source 32 and reflected by the object 12, the object 13, and the like. Then, the imaging element 42 supplies the generated pixel signal to the signal processing circuit 43.

Note that the reference signal includes a reference code used for detection of a correlation with reception light. In the following, a function indicating a reference code is referred to as f(t).

Under the control by the control unit 23, the signal processing circuit 43 performs processing of the pixel signal supplied by the imaging element 42. For example, the signal processing circuit 43 generates a normal image or a range image based on the pixel signal supplied by the imaging element 42. The signal processing circuit 43 supplies the generated normal image or range image to the control unit 23. The control unit 23 includes, for example, a control circuit or a processor such as a field programmable gate array (FPGA) or a digital signal processor (DSP). The control unit 23 controls the lighting control unit 31, the imaging element 42, and the signal processing circuit 43. Also, the control unit 23 supplies the normal image or the range image acquired from the imaging unit 22 to the display unit 24 and displays the image onto the display unit 24. Moreover, the control unit 23 stores the normal image or range image acquired from the imaging unit 22 into the storage unit 25. Also, the control unit 23 outputs the normal image or the range image acquired from the imaging unit 22 to the outside.

The display unit 24 includes, for example, a panel-type display device such as a liquid crystal display device or an organic electro luminescence (EL) display device.

The storage unit 25 includes, for example, an arbitrary storage device or storage medium and stores a normal image, a range image, and the like.

{Configuration Example of Imaging Element 42}

Figure 2:
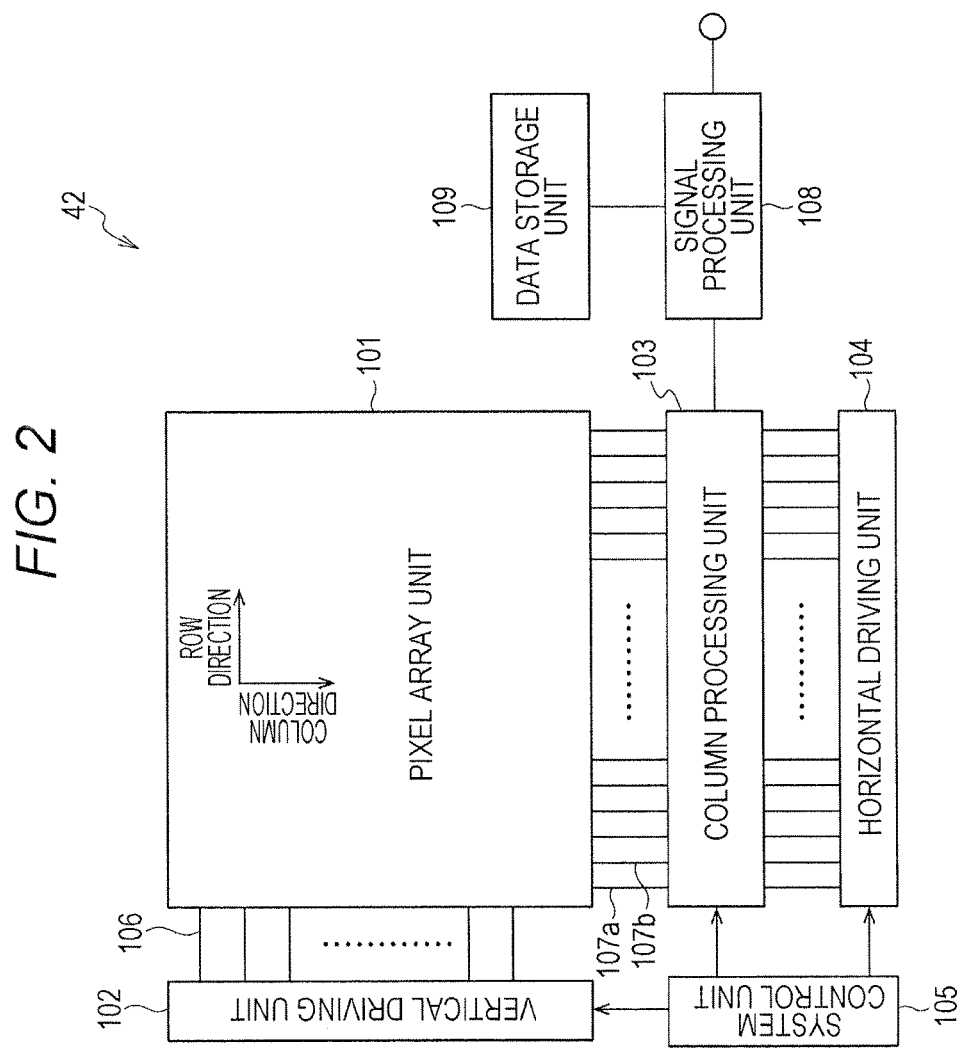
FIG. 2 is a block diagram illustrating a configuration example of an imaging element.

FIG. 2 is a view illustrating a configuration example of the imaging element 42.

The imaging element 42 includes a pixel array unit 101, a vertical driving unit 102, a column processing unit 103, a horizontal driving unit 104, a system control unit 105, a pixel driving line 106, vertical signal lines 107a and 107b, a signal processing unit 108, and a data storage unit 109.

The pixel array unit 101 includes a pixel including a photoelectric conversion element that generates and accumulates a charge corresponding to an amount of light entering from an object. Pixels included in the pixel array unit 101 are arranged two-dimensionally in a horizontal direction (row direction) and a vertical direction (column direction) in the drawing.

For example, in the pixel array unit 101, the pixel driving line 106 is wired in the row direction in each pixel row including pixels arrayed in the row direction. Also, the vertical signal lines 107a and 107b are wired in the column direction in each pixel column including pixels arrayed in the column direction.

The vertical driving unit 102 includes a shift register, an address decoder, and the like and drives the pixels in the pixel array unit 101 simultaneously or in a row unit by supplying a signal or the like to each pixel through a plurality of pixel driving lines 106.

The column processing unit 103 generates a pixel signal by reading a signal from each pixel in each pixel column of the pixel array unit 101 through the vertical signal lines 107a and 107b and performing noise removing processing, correlated double sampling processing, analog to digital (A/D) conversion processing, and the like.

The horizontal driving unit 104 includes a shift register, an address decoder, and the like and serially selects a unit circuit corresponding to a pixel column in the column processing unit 103. By the selection scanning performed by the horizontal driving unit 104, a pixel signal processed with respect to each unit circuit in the column processing unit 103 is serially output to the signal processing unit 108. The system control unit 105 includes, for example, a timing generator to generate various timing signals and performs driving control of the vertical driving unit 102, the column processing unit 103, and the horizontal driving unit 104 based on the timing signals generated in the timing generator.

While temporarily storing data into the data storage unit 109 when necessary, the signal processing unit 108 performs signal processing such as calculation processing with respect to the pixel signal supplied by the column processing unit 103 and outputs an image signal including each pixel signal.

{Configuration Example of Unit Pixel 151}

Figure 3:
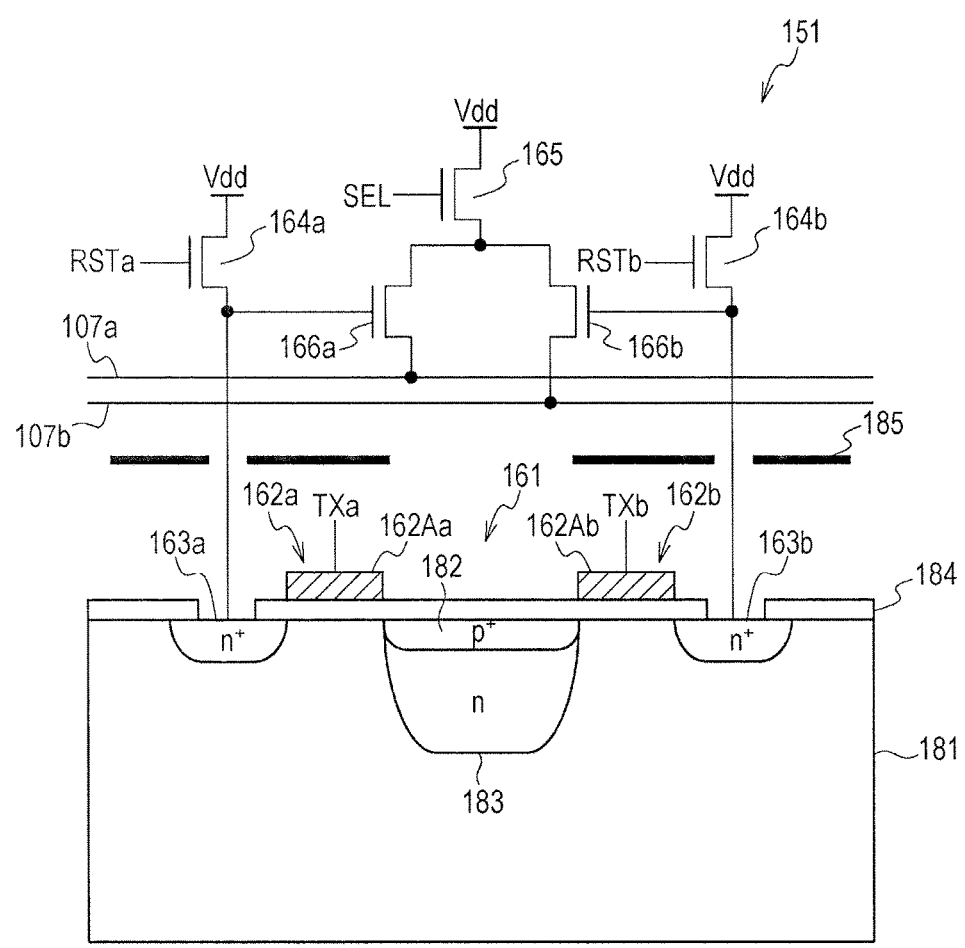
FIG. 3 is a schematic view of a cross section of a unit pixel.

Then, a configuration of the unit pixel 151 included in the pixel array unit 101 of the imaging element 42 will be described with reference to FIG. 3 and FIG. 4. FIG. 3 is a schematic view of a cross section of the unit pixel 151 and FIG. 4 is a view illustrating an equivalent circuit of the unit pixel 151.

The unit pixel 151 includes a photoelectric conversion element 161, transfer gates 162a and 162b, floating diffusion regions (FD) 163a and 163b, reset transistors 164a and 164b, a selection transistor 165, and amplifier transistors 166a and 166b.

Figure 4:
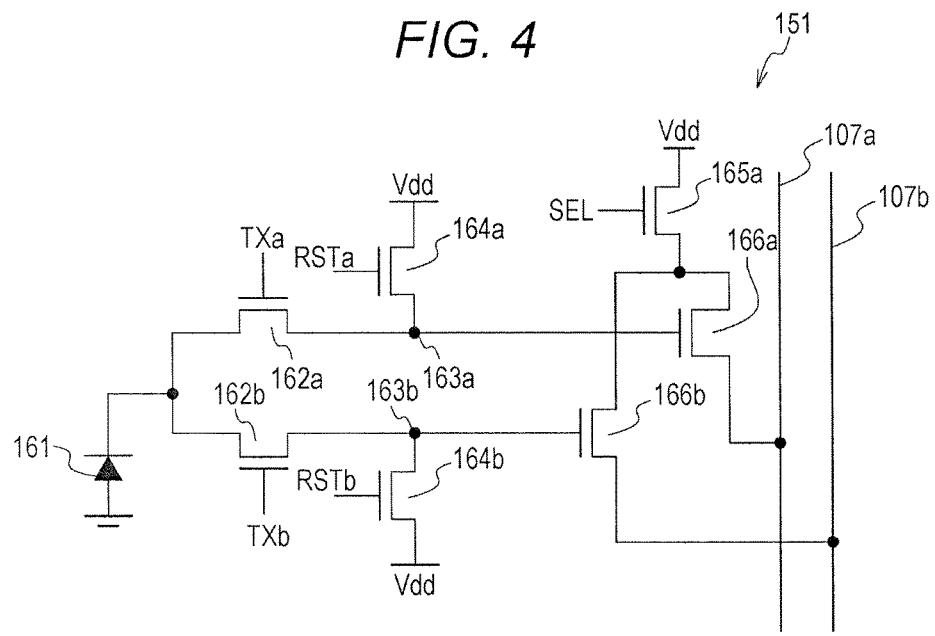
FIG. 4 is a view illustrating an equivalent circuit of the unit pixel.

Note that in each of FIG. 3 and FIG. 4, an example in which each of the reset transistors 164a and 164b, the selection transistor 165, and the amplifier transistors 166a and 166b is an N-channel MOS transistor is illustrated. However, a combination of conductivity types of the reset transistors 164a and 164b, the selection transistor 165, and the amplifier transistors 166a and 166b is not limited to this example. The photoelectric conversion element 161 includes, for example, an embedded-type photodiode. More specifically, a p-type layer 182 is formed on a surface side of a p-type semiconductor substrate 181 and an n-type embedded layer 183 is embedded thereto, whereby the photoelectric conversion element 161 is formed.

The transfer gate 162a includes a gate electrode 162Aa. The gate electrode 162Aa is formed in such a manner as to cover a region between the photoelectric conversion element 161 and the FD 163a via an insulating film 184 formed on a surface of the semiconductor substrate 181. To the gate electrode 162Aa, a transfer signal TXa is supplied by the vertical driving unit 102 through the pixel driving line 106. When a voltage of the transfer signal TXa is set at a predetermined High level and the transfer gate 162a becomes conductive, the charge generated by the photoelectric conversion element 161 is transferred to the FD 163a through the transfer gate 162a. The transfer gate 162b includes a gate electrode 162Ab. The gate electrode 162Ab is formed in such a manner as to cover a region between the photoelectric conversion element 161 and the FD 163b via the insulating film 184 formed on the surface of the semiconductor substrate 181. To the gate electrode 162Ab, a transfer signal TXb is supplied by the vertical driving unit 102 through the pixel driving line 106. When a voltage of the transfer signal TXb is set at a predetermined High level and the transfer gate 162b becomes conductive, the charge generated by the photoelectric conversion element 161 is transferred to the FD 163b through the transfer gate 162b. Note that the transfer signal TXa is identical to a reference signal supplied to the system control unit 105 by the control unit 23 and the transfer signal TXb is a bit-inverted reference signal. Thus, the charge generated by the photoelectric conversion element 161 is distributed to the FD 163a or the FD 163b. When a correlation between the reception light that enters the photoelectric conversion element 161 and the reference signal is high, an amount of charge transferred to and accumulated in the FD 163a is increased and an amount of charge transferred to and accumulated in the FD 163b is decreased, whereby a difference between the two is increased. On the other hand, when a correlation between the reception light that enters the photoelectric conversion element 161 and the reference signal is low, a difference between an amount of charge transferred to and accumulated in the FD 163a and an amount of charge transferred to and accumulated in the FD 163b is decreased. The insulating film. 184 is formed in such a manner as to cover the whole surface of the semiconductor substrate 181 except for a part of an upper side of the FD 163a and a part of an upper side of the FD 163b.

A light shielding film 185 is formed in such a manner as to cover a whole upper side of the semiconductor substrate 181 except for an upper side of the photoelectric conversion element 161, a part of the upper side of the FD 163a, and a part of the upper side of the FD 163b.

The FD 163a accumulates the charge transferred from the photoelectric conversion element 161 through the transfer gate 162a and converts the accumulated charge into voltage.

The FD 163b accumulates the charge transferred from the photoelectric conversion element 161 through the transfer gate 162b and converts the accumulated charge into voltage. A drain electrode of the reset transistor 164a is connected to a pixel power source Vdd and a source electrode thereof is connected to the FD 163a and a gate electrode of the amplifier transistor 166a. To a gate electrode of the reset transistor 164a, a reset signal RSTa is supplied by the vertical driving unit 102 through the pixel driving line 106.

When a voltage of the reset signal RSTa is set at a predetermined High level and the reset transistor 164a is turned on, the FD 163a is reset and the charge is discharged from the FD 163a.

A drain electrode of the reset transistor 164b is connected to the pixel power source Vdd and a source electrode thereof is connected to the FD 163b and a gate electrode of the amplifier transistor 166b. To a gate electrode of the reset transistor 164b, a reset signal RSTb is supplied by the vertical driving unit 102 through the pixel driving line 106.

When a voltage of the reset signal RSTb is set at a predetermined High level and the reset transistor 164b is turned on, the FD 163b is reset and the charge is discharged from the FD 163b.

A drain electrode of the selection transistor 165 is connected to the pixel power source Vdd and a source electrode thereof is connected to a drain electrode of the amplifier transistor 166a and a drain electrode of the amplifier transistor 166b. A source electrode of the amplifier transistor 166a is connected to the vertical signal line 107a. A source electrode of the amplifier transistor 166b is connected to the vertical signal line 107b.

To a gate electrode of the selection transistor 165, a selection signal SEL is supplied by the vertical driving unit 102 through the pixel driving line 106. When a voltage of the selection signal SEL is set at a predetermined High level and the selection transistor 165 is turned on, a unit pixel 151 from which a pixel signal is to be read is selected. That is, when the selection transistor 165 is on, the amplifier transistor 166a supplies a signal SPa indicating a voltage of the FD 163a to the column processing unit 103 through the vertical signal line 107a. When the selection transistor 165 is on, the amplifier transistor 166b supplies a signal SPb indicating a voltage of the FD 163b to the column processing unit 103 through the vertical signal line 107b.

Then, the signal processing unit 108 of the imaging element 42 generates a differential signal of the signal SPa and the signal SPb supplied by each unit pixel 151 through the column processing unit 103. Also, the signal processing unit 108 supplies the differential signal, as the pixel signal of each unit pixel 151, to the signal processing circuit 43. Thus, the pixel signal output from the imaging element 42 becomes a signal indicating a correlation between the reference signal and the reception light in each unit pixel 151. That is, when the correlation between the reference signal and the reception light is high, a value of the pixel signal becomes large. When the correlation between the reference signal and the reception light is low, a value of the pixel signal becomes small.

{Basic Operation of Imaging Element 42}

Next, a basic operation of the imaging element 42 will be described with reference to FIG. 5.

For example, irradiation light emitted from the light source 32 according to an irradiation code g(t) is scattered on a surface of an object and a part of the light enters the photoelectric conversion element 161 of each unit pixel 151 of the imaging element 42 in time $\tau$ after the emission of the irradiation light. Intensity of the light that enters the photoelectric conversion element 161 is expressed by $Rg(t-\tau)$.

Here, R indicates reflectivity of an object.

Here, when the control unit 23 supplies a reference signal including a reference code f(t) to the imaging element 42 and supplies, to the lighting control unit 31, an irradiation signal including an irradiation code $g(t+\phi)$ that is an irradiation code g(t) a phase of which is shifted for a shift amount $\phi$ with respect to the reference code f(t), a pixel signal $b_i(\phi)$ output from each unit pixel 151 is expressed by the following expression (1).

[Mathematical Formula 1]

$$b_i(\phi)=\int_0^\infty \alpha_i(\tau) \cdot \int_0^T Rg(t+\phi-\tau)f(t)dt\, d\tau \quad (1)$$

Note that the shift amount $\phi$ is a shift amount of an actual phase which amount is converted into time. Also, i indicates an index of each unit pixel 151 and T indicates exposure time. Moreover, $\alpha_i(\tau)$ indicates an attenuation coefficient determined by a path, in which light entering each unit pixel 151 is propagated, and is expressed by the following expression (2).

[Mathematical Formula 2]

$$\alpha_i(\tau)=\int_p \alpha_{i,p}\delta(|p|-\tau)dp \quad (12)$$

Then, with appropriate designing of the reference code f(t) and the irradiation code g(t), depth selectivity of the imaging device 11 is realized. The depth selectivity is to make it possible to increase sensitivity with respect to an intended distance (depth) from the imaging device 11 and to set sensitivity extremely low with respect to the other distance (depth). That is, the depth selectivity is to make it possible to set sensitivity high with respect only to light from an object at an intended distance from the imaging device 11.

Here, it is assumed that reflectivity $\beta(x, y)$ at each position $z(x, y)$ on a plane a distance to which from the imaging device 11 is z is given and that each pixel signal $I(x, y)$ of an image with respect to the plane is given by the following expression (3) with utilization of a depth-dependent attenuation coefficient $\gamma(\tau)$.

$$I(x,y)=\gamma(\tau_{z(x,y)})\times\beta(x,y) \quad (3)$$

Then, the reference code f (t) and the irradiation code g(t) are set in such a manner as to satisfy the following expression (4), whereby the depth selectivity is realized.

[Mathematical Formula 3]

$$\int_0^T g(t+\phi-\tau)f(t)\,dt = \gamma(\tau)f(t), g(t) \in \mathbb{Z} \quad (4)$$

Note that in the expression (4), an identifier (x, y) of each pixel is omitted.

Thus, in order to realize the depth selectivity, a cross-correlation between the reference code f(t) and the irradiation code g(t) is made closer to an intended depth-dependent attenuation coefficient γ(τ) as much as possible. This is given as a minimization problem of the following expression (5).

[Mathematical Formula 4]

$$\{f, g\} = \underset{f,g}{\arg\min}\left(\int_0^T g(t+\phi-\tau)f(t)\,dt - \gamma(\tau)\right)^2 f(t), g(t) \in \mathbb{Z} \quad (5)$$

That is, a reference code f(t) and an irradiation code g(t) that minimize a cost function of the expression (5) without violating a designing limit are calculated. As an example of such a code, there is an M-sequence.

Figure 5:
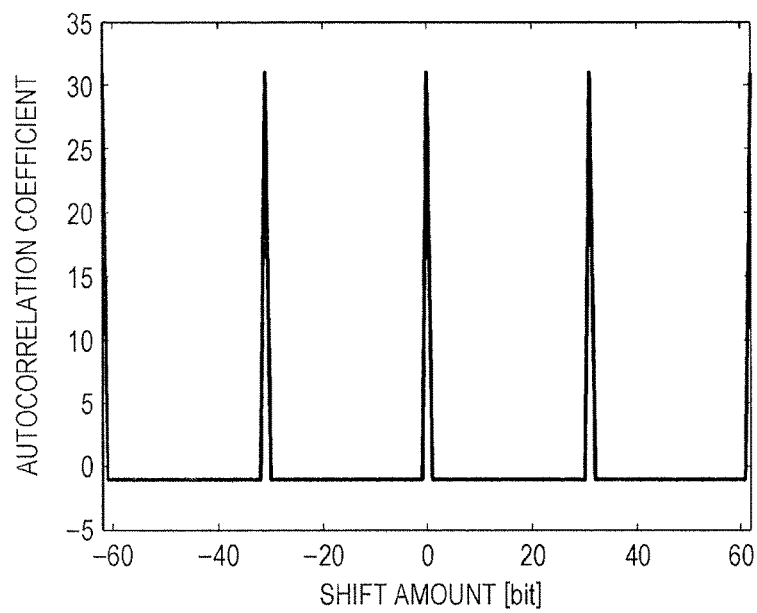
FIG. 5 is a graph illustrating an autocorrelation of an M-sequence.

FIG. 5 is a graph illustrating an autocorrelation coefficient of a 31-bit M-sequence. A horizontal axis in FIG. 5 indicates a shift amount of an M-sequence and a vertical axis indicates an autocorrelation coefficient.

As illustrated in this graph, the autocorrelation coefficient of the M-sequence has a wave form with a sharp triangular impulse in each bit length of the M-sequence (31 bit in this example). More specifically, the autocorrelation coefficient of the M-sequence becomes an impulse triangular wave in a range of a bit length×i−1 ≤ a shift amount ≤ a bit length×i+1 (i is integer number) and reaches its peak when the shift amount is a bit length×i bit. On the other hand, the auto-correlation coefficient of the M-sequence becomes almost 0 when the shift amount is the other value. Here, when M-sequences having the same value are used for the reference code f(t) and the irradiation code g(t), a wave form of a cross-correlation coefficient between a reference signal and reception light including reflection light of irradiation light emitted in a pattern indicated by the irradiation code g(t) is similar to what is illustrated in FIG. 5. Then, when a phase of the irradiation code g(t) is shifted with respect to the reference code f(t), a cross-correlation coefficient between reception light, which becomes incident after a period of time corresponding to the shift amount, and the reference signal reaches its peak. That is, a cross-correlation coefficient between reception light from a distance (depth) corresponding to the shift amount and the reference signal reaches its peak. As a result, it is possible to extract reception light from the distance corresponding to the peak of the cross-correlation coefficient and to detect an object at the distance.

Thus, with control of a phase of the irradiation code g(t), an object at an intended distance from the imaging device 11 can be detected. Also, by using a plurality of irradiation codes g(t) with different phases, it is possible to detect a plurality of objects at different distances and to set a range of detection of an object.

Thus, for example, as expressed in the following expression (6), the imaging device 11 generates an irradiation code g(t) by performing weighted adding while shifting a phase of a reference code f(t).

[Mathematical Formula 5]

$$g(t) = \sum_i \beta_i f(t + \phi i) \quad (6)$$

Note that $\beta_i$ in the expression (6) is weight and $\phi_i$ is a shift amount of a phase which amount is converted into time. That is, the irradiation code g(t) includes, with the reference code f(t) as a code to be a basic unit (hereinafter, referred to as basic code), a code in which weighted adding of a plurality of codes, in which a phase of the basic code is shifted, (hereinafter, referred to as unit code) is performed. Thus, the irradiation code g(t) is a code ($f(t+\phi_i)$) in which a phase of the reference code f(t) that is the basic code is shifted. Note that in a case of $\phi i=0$, the unit code becomes a code identical to the reference code f(t) (basic code). As described later, the imaging device 11 can divide a scene into layers in a depth direction and can photograph a normal image or a range image of an intended layer by controlling the weight $\beta_i$ and the shift amount $\phi_i$. Also, the imaging device 11 can photograph a normal image or a range image in a range in an intended depth direction by superimposition of a plurality of layers.

{In Case of using Imaging Device 11 as Depth Selection Camera}

Next, processing in a case of using the imaging device 11 as a depth selection camera will be described. Here, the depth selection camera is a camera that can extract and photograph an object in a range in an intended depth direction (region of interest (ROI)).

In a case of using the imaging device 11 as the depth selection camera, a reference code f(t) and an irradiation code g(t) that satisfy the following expression (7) are used, for example.

[Mathematical Formula 6]

$$\{f, g\} = \underset{f,g}{\arg\min}\left(\int_0^T g(t+\phi-\tau)f(t)\,dt - I_{(\phi1,\phi2)}\right)^2 f(t), \quad (7)$$

$$g(t) \in \mathbb{Z}$$

Note that I(φ1, φ2) is an indicator function that becomes 1 in a range in which (time correspond to) a phase is φ1 to φ2 and that becomes 0 in the other range.

For example, it is possible to acquire a reference code f(t) and an irradiation code g(t) that satisfy the expression (7) by setting the weight $\beta_i$ and the shift amount $\phi_i$ of the above expression (6) in the following expressions (8) and (9).

[Mathematical Formula 7]

$$\beta_i \in B_{int} = \{1,1,1,\ldots,1\}, \quad (8)$$

$$\phi_i \in \Phi_{int} = \{\phi_0, \phi_0+\Delta\phi, \phi_0+2\Delta\phi, \ldots, \phi_0+(n-1)\Delta\phi\} \quad (9)$$

Note that $\phi_0$ is a shift amount of a phase corresponding to a starting point of the ROI, which amount is converted into time, and will be referred to as an offset amount $\phi_0$ in the following.

Here, Δφ is a shift amount of a phase, which amount is converted into time, and is set at time corresponding to one bit of the basic code (reference code f(t)), for example.

Also, n indicates the number of unit codes superimposed in the irradiation code g(t). By control of the number of times of superimposition n, a value of (n−1)Δφ is controlled.

Thus, the control unit 23 can control a range ($\phi_0$ to $(n-1)\Delta\phi$) of a phase of a superimposed unit code by controlling the offset amount $\phi_0$ and the number of times of superimposition n.

Figure 6:
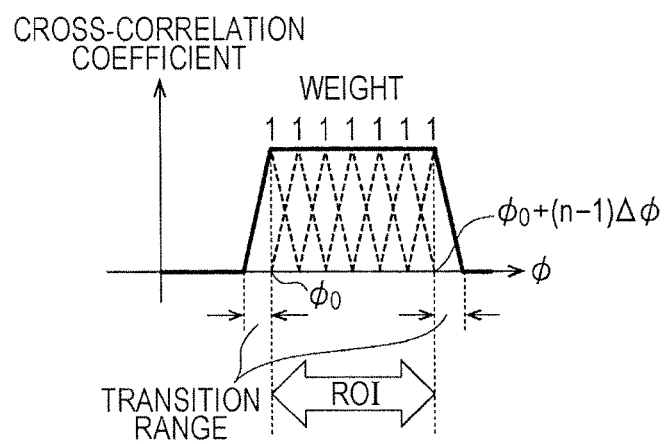
FIG. 6 is a graph illustrating an example of a cross-correlation between a reference signal and an irradiation signal in a case where the imaging device is used as a depth selection camera.

Then, n unit codes having a phase difference with equal intervals (shift amount $\Delta\phi$) in a range of a phase from the offset amount $\phi_0$ to a phase $\phi_0+(n-1)\Delta\phi$ are added with the same weight, whereby the irradiation code g(t) is acquired. FIG. 6 is a graph illustrating a cross-correlation coefficient between a reference signal and an irradiation signal of when the weight $\beta_i$ in the expression (8) and the shift amount $\phi_i$ in the expression (9) are used. A horizontal axis in FIG. 6 indicates a phase (converted into time) and a vertical axis indicates a cross-correlation coefficient.

Each triangular wave form indicated by a dotted line in the drawing indicates a cross-correlation coefficient between a reference code f(t) and each unit code $\beta_i g(t+\phi_i)$ before superimposition. Then, by superimposition of the cross-correlation coefficient between the reference code f(t) and each unit code $\beta_i g(t+\phi_i)$, a cross-correlation coefficient between a reference signal (reference code f(t)) and an irradiation signal (irradiation code g(t)) which coefficient is indicated by a solid line is acquired. A wave form of a cross-correlation coefficient between a reference signal and an irradiation signal becomes a trapezoid. As described above, the starting point of the ROI becomes a distance corresponding to the offset amount $\phi_0$. Also, a rage in a depth direction of the ROI becomes a range from the distance corresponding to the offset amount $\phi_0$ to a distance corresponding to the phase $\phi_0+(n+1)\Delta\phi$.

Thus, the control unit 23 can control a range of the ROI by controlling the offset amount $\phi_0$, the number of times of superimposition n, and a range of a phase of a superimposed unit code ($\phi_0$ to $\phi_0+(n-1)\Delta\phi$).

Then, the imaging device 11 can photograph an object, a distance of which in the depth direction from the imaging device 11 is within the range of the ROI, and can prevent photographing of an object or the like outside the range of the ROI. Accordingly, for example, it becomes possible to control an influence of reflection light or scattering light due to a surrounding object, a background, rain, fog, snow, or the like and to photograph an intended object well. Here, as illustrated in FIG. 6, a transition range with an inclined wave form appears in each end of the cross-correlation coefficient between the reference signal and the irradiation signal. For example, when a modulation frequency of the reference code f(t) and the irradiation code g(t) is set as 50 MHz, a width of the transition range (hereinafter, referred to as transition width) becomes about three meters. By narrowing down the transition width, it becomes possible to accurately extract and photograph an object in the range of the ROI. Thus, a method of reducing the transition width will be described with reference to FIG. 7 to FIG. 8B.

First, it is considered to reduce the transition width by increasing a modulation frequency of the reference signal and the irradiation signal. However, it is generally difficult to increase the modulation frequency due to a limit in hardware and the like.

On the other hand, it is possible to set the transition width as an intended value by controlling by controlling a cross-correlation coefficient between the reference signal and the irradiation signal.

More specifically, for example, the weight $\beta_i$ and the shift amount $\phi_i$ of the above expression (6) are set in a manner expressed in the following expressions (10) and (11).

[Mathematical Formula 8]

$$\beta_i \in B_{sharp} = \{1, -1\} \quad (10)$$

$$\phi_i \in \phi_{sharp} = \{\phi_0, \phi_0 + \varepsilon\} \ldots \quad (11)$$

Note that in the expression (10), the weight $\beta$ is set as a negative value (−1). A code that is a bit-inverted basic code (reference code f(t)) is added by utilization of positive weight having the same absolute value, whereby the weighted adding in which this negative weight 13 is used is realized.

Figure 7:
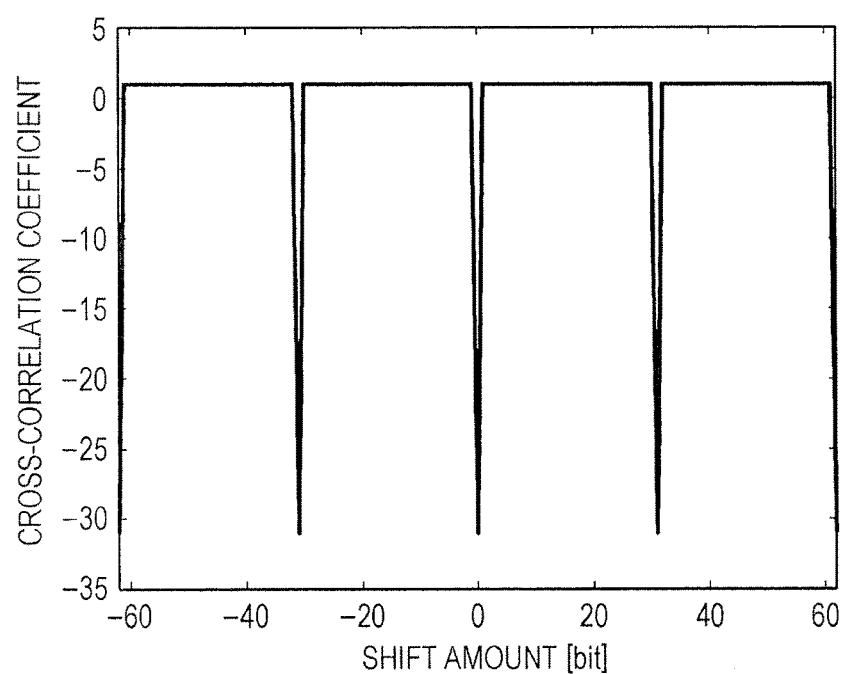
FIG. 7 is a graph illustrating a cross-correlation between an M-sequence and a code with a bit-inverted M-sequence.

For reference, FIG. 7 is a graph illustrating a cross-correlation between a 31-bit M-sequence and a code with a bit-inverted M-sequence. A horizontal axis in FIG. 7 indicates a shift amount and a vertical axis indicates a cross-correlation coefficient. In the graph, positive and negative are inverted from those of the graph in FIG. 5 and a negative correlation is illustrated.

Figure 8A:
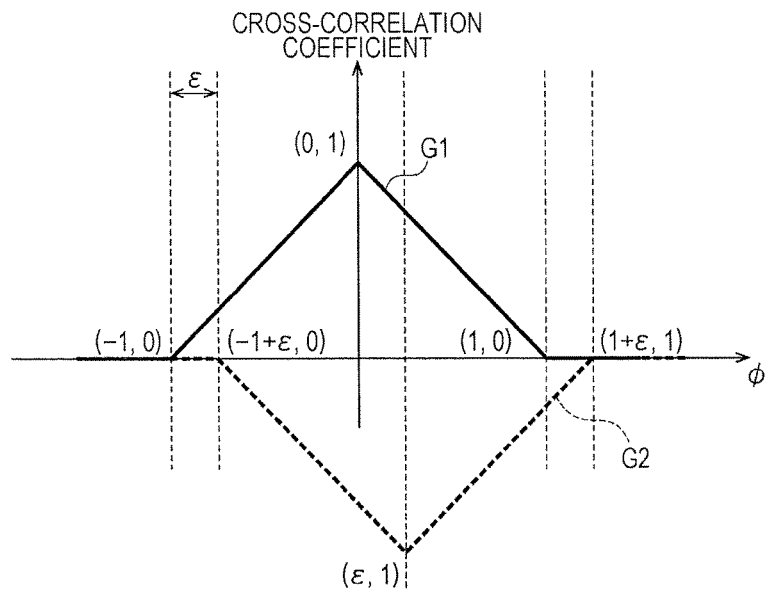
FIG. 8B is a graph illustrating a cross-correlation between a reference signal and an irradiation signal in a case of reducing a transition width.
Figure 8B:
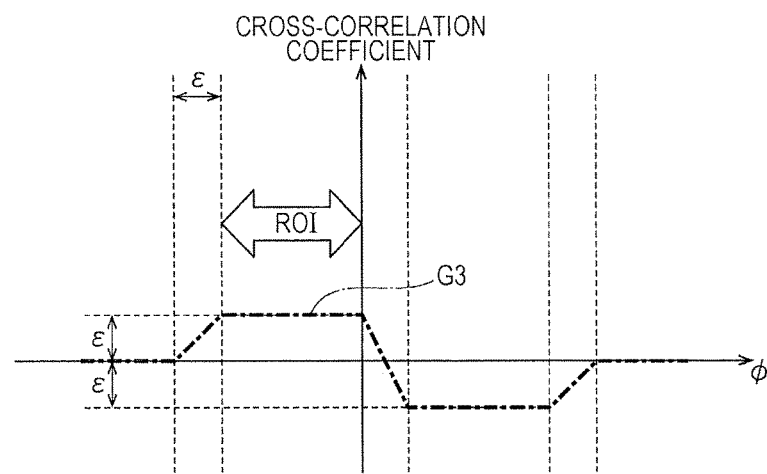

Also, each of FIG. 8A and FIG. 8B is a graph illustrating a cross-correlation coefficient between a reference signal and an irradiation signal in a case where the weight $\beta_i$ and the phase shift amount $\phi_i$ are set in the above expressions (10) and (11).

A graph with a solid line G1 in FIG. 8A indicates a cross-correlation coefficient between the reference code f(t) and a unit code in a case where the weight $\beta=1$ and the shift amount is set as the offset amount $\phi_0$. That is, a cross-correlation coefficient between a reference code f(t) and a unit code that is a basic code a phase of which is shifted for the offset amount $\phi_0$ and which is multiplied by the weight $\beta(=1)$ is indicated.

A graph with a dotted line G2 in FIG. 8A indicates a cross-correlation coefficient between a reference code f(t) and a unit code in a case where the weight $\beta=-1$ and the shift amount is set as $\phi_0+\varepsilon$. That is, a cross-correlation coefficient between a reference code f(t) and a unit code that is a basic code a phase of which is shifted for the shift amount $\phi_0+\varepsilon$ and which is multiplied by the weight $\beta(=-1)$ is indicated.

Note that in this example, normalization is performed in such a manner that an absolute value of a peak value of the cross-correlation coefficient becomes 1. Note that the shift amount $\phi_0$ is set as 0.

Then, a cross-correlation coefficient between a reference signal (reference code f(t)) and an irradiation signal (irradiation code g(t)) becomes what is indicated by a graph with a dotted-dashed line G3 in FIG. 8B by superimposition of the cross-correlation coefficient indicated by the graph G1 and the cross-correlation coefficient indicated by the graph G2. While a transition width in each of the graph G1 and the graph G2 in FIG. 8A is 1, a transition width in the graph G3 in FIG. 8B is reduced to $\varepsilon(<1)$.

In such a manner, the control unit 23 can reduce a transition width of a cross-correlation coefficient between a reference signal and an irradiation signal into an arbitrary value $\varepsilon$ by controlling a shift amount $\varepsilon$. Also, the control unit 23 can control a range of the ROI by controlling the offset amount $\phi 0$ and the shift amount $\varepsilon$.

Note that in a case of increasing a width of the ROI while reducing a transition width, the weight $\beta_i$ and the shift amount $\phi_i$ of the above expression (6) are set in a manner expressed in the following expressions (12) and (13).

[Mathematical Formula 9]

$$\beta_i \in B_{sharp} = \{1, -1, 2, -2, \ldots, n, -n\} \quad (12)$$

$$\phi_i \in \phi_{sharp} = \{\phi_0 + \varepsilon, \phi_0 \Delta\phi, \phi_0 + \varepsilon, \ldots, \phi_0 + (n-1)\Delta\phi, \phi_0 + (n-1)\Delta\phi + \varepsilon\} \ldots \quad (13)$$

More specifically, n unit codes having a phase difference with equal intervals (shift amount $\Delta\phi$) in a range of a phase from the offset amount $\phi_0$ to the phase $\phi_0+(n-1)\Delta\phi$ are added with weight increased by 1 in a linear shape from 1 to n as a shift amount of a phase with respect to a basic code is increased, whereby a first superimposed code is acquired. Also, n unit codes that are the above n unit codes phases of which are shifted for the shift amount $\varepsilon$ are added with weight decreased by $-1$ in a linear shape from $-1$ to $-n$ as a shift amount of a phase with respect to a basic code is increased, whereby a second superimposed code is acquired. Then, the first superimposed code and the second superimposed code are added to each other and an irradiation code g(t) is acquired. A transition width of a cross-correlation coefficient between an irradiation signal including the acquired irradiation code g(t) and the reference signal becomes $\varepsilon$. Also, a width in a depth direction of the ROI is a distance corresponding to a phase from the phase $\phi_0+\varepsilon$ to the phase $\phi_0+(n-1)\Delta\phi$. Thus, the control unit 23 can control a range of the ROI by controlling the offset amount $\phi_0$, the shift amount $\varepsilon$, the number of times of superimposition n, a range of a phase of a superimposed unit code ($\phi_0$ to $\phi_0+(n-1)\Delta\phi+\varepsilon$), and the transition width $\varepsilon$.

Also, since it is possible to acquire an image in a range of an intended ROI in one time of photographing, a frame memory becomes unnecessary.

{In Case of using Imaging Device 11 as Depth Camera}

Next, processing in a case of using the imaging device 11 as a depth camera will be described with reference to FIG. 9A and FIG. 9B. Here, the depth camera is a camera that detects a distance in a depth direction of an object in each pixel and that generates a range image including a range pixel signal that is based on the detected distance.

In a case of using the imaging device 11 as a depth camera, for example, the weight $\beta_i$ and the shift amount $\phi_i$ of the above expression (6) are set in a manner expressed in the following expressions (14) to (16).

[Mathematical Formula 10]

$$\beta_{i,1} \in B_{depth,1} = \{n, n-1, \ldots, 1, 0\} \quad (14)$$

$$\beta_{i,2} \in B_{depth,2} = \{0, 1, \ldots, n-1, n\} \quad (15)$$

$$\phi_i \in \phi_{depth} = \{\phi_0, \phi_0+\Delta\phi, \phi_0+2\Delta\phi, \ldots, \phi_0+n\Delta\phi\} \quad (16)$$

Note that weight $\beta_{i,1}$ indicates weight in first photographing and weight $\beta_{i,2}$ indicates weight in the second photographing. The weight $\beta_{i,1}$ is decreased in a linear shape from n to 0 by 1. The weight $\beta_{i,2}$ is increased in a linear shape from 0 to n by 1.

Then, an irradiation code g(t) in the first photographing is acquired by utilization of the weight $\beta_i$ in the expression (14) and the shift amount $\phi_i$ in the expression (16). That is, n+1 unit codes having a phase difference with equal intervals (shift amount $\Delta\phi$) in a range of a phase from the offset amount $\phi_0$ to a phase $\phi_0+n\Delta\phi$ are added with weight decreased in a linear shape as a shift amount of a phase with respect to a basic code is increased, whereby the irradiation code g(t) in the first photographing is acquired.

Also, an irradiation code g(t) in the second photographing is acquired by utilization of weight $\beta_i$ in an expression (15) and a shift amount in an expression (16). That is, n+1 unit codes having a phase difference with equal intervals (shift amount $\Delta\phi$) in a range of a phase from the offset amount $\phi_0$ to the phase $\phi_0+n\Delta\phi$ are added with weight increased in a linear shape as a shift amount of a phase is increased, whereby the irradiation code g(t) in the second photographing is acquired.

Figure 9A:
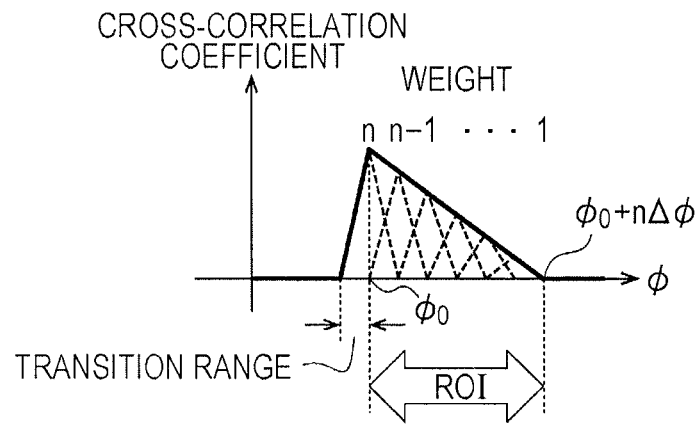
FIG. 9B is a graph illustrating an example of a cross-correlation between a reference signal and an irradiation signal in a case where the imaging device is used as a depth camera.
Figure 9B:
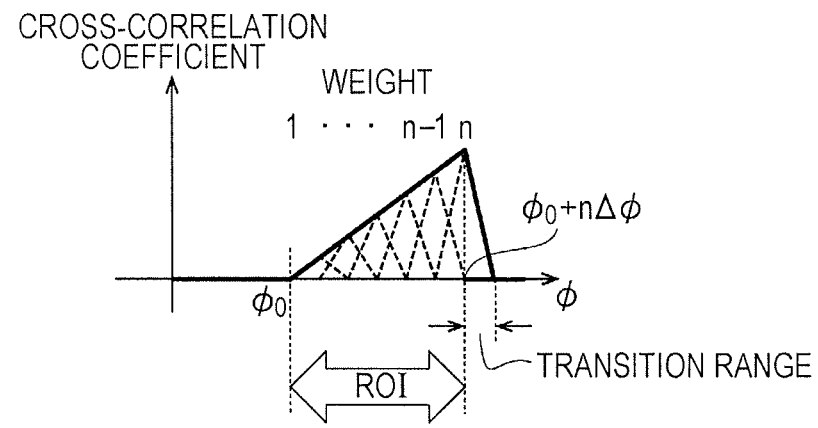

FIG. 9A is a graph illustrating a cross-correlation coefficient between a reference signal and an irradiation signal in the first photographing. A horizontal axis in FIG. 9A indicates a phase (converted into time) and a vertical axis indicates a cross-correlation coefficient.

Each triangular wave form indicated by a dotted line indicates a cross-correlation coefficient between a reference code f (t) and each unit code $\beta_{i,1}g(t+\phi_i)$ before superimposition. Then, by the superimposition of the cross-correlation coefficient between the reference code f (t) and each unit code $\beta_{i,1}g(t+\phi_i)$, a cross-correlation coefficient between a reference signal (reference code f(t)) and an irradiation signal (irradiation code g(t)) which coefficient is indicated by a solid line is acquired. A wave form of the cross-correlation coefficient in the first photographing reaches its peak in the phase $\phi_n$, is decreased in a linear shape from the phase $\phi_0$ to the phase $\phi_0+n\Delta\phi$, and becomes 0 in the phase $\phi_0+n\Delta\phi$. FIG. 9B is a graph illustrating a cross-correlation coefficient between a reference signal and an irradiation signal in the second photographing. A horizontal axis in FIG. 9B indicates a phase (converted into time) and a vertical axis indicates a cross-correlation coefficient.

Each triangular wave form indicated by a dotted line indicates a cross-correlation coefficient between a reference code f(t) and each unit code $\beta_{i,2}g(t+\phi_i)$ before superimposition. Then, by the superimposition of the cross-correlation coefficient between the reference code f (t) and each unit code $\beta_{i,2}g(t+\phi_i)$, a cross-correlation coefficient between a reference signal (reference code f (t)) and an irradiation signal (irradiation code g (t)) which coefficient is indicated by a solid line is acquired. A wave form of the cross-correlation coefficient in the second photographing becomes 0 in the phase $\phi_0$, is increased in a linear shape from the phase $\phi_0$ to the phase $\phi_0+n\Delta\phi$, and reaches its peak in the phase $\phi_0+n\Delta\phi$. When it is assumed that a pixel signal output from the imaging element 42 by utilization of the cross-correlation coefficient in FIG. 9A during first measurement is S1 and that a pixel signal output from the imaging element 42 by utilization of the cross-correlation coefficient in FIG. 9B during second measurement is S2, a relationship between a distance z to an object and the pixel signals S1 and S2 is expressed by the following expression (17).

[Mathematical Formula 11]

$$z - z_0 \propto \frac{S_2}{S_1 + S_2} \quad (17)$$

That is, a value in which a distance $z_0$ corresponding to the offset amount $\phi_0$ is subtracted from the distance z is proportional to a ratio of the pixel signal S2 in a signal to which the pixel signal S1 and the pixel signal S2 are added. For example, based on a ratio of the pixel signal S1 and the pixel signal S2 supplied by the imaging element 42, the signal processing circuit 43 generates a pixel distance signal expressed on a right side of the expression (17). Then, the signal processing circuit 43 generates a range image including the generated pixel distance signal and supplies the image to the control unit 23.

Also, the control unit 23 can control a range of the ROI by controlling the offset amount $\phi_0$, the number of times of superimposition n, and a range of a phase of a superimposed unit code ($\phi_0$ to $\phi_0+n\Delta\phi$).

Then, the imaging device 11 can photograph a range image of an object, a distance of which in a depth direction from the imaging device 11 is within the range of the ROI, and can prevent photographing of an object or the like outside the range of the ROI. Accordingly, for example, it becomes possible to control an influence of reflection light or scattering light due to a surrounding object, a background, rain, fog, snow, or the like and to photograph a range image of an intended object well.

{Method of Generating Irradiation Code g(t)}

In the above, an example of generating an irradiation code g(t) by performing weighted adding of unit codes having different phases has been described. Here, a detailed method of superimposing unit codes will be described.

For example, unit codes having different phases are lined up in an interleaving manner in a time direction (lined up in direction of time). More specifically, while a reference code f(t) is repeatedly output with a phase being fixed, a basic code is synchronized to the reference code f(t), is lined up in time series with a phase being shifted by the shift amount $\Delta\phi$ from the offset amount $\phi_0$ with respect to the reference code f(t), and is output. Thus, an irradiation code g(t) is output.

Note that unit codes are not necessarily lined up in order of phases and may be lined up in arbitrary order. Also, in one time of photographing (in one frame), n unit codes, phases of which with respect to a basic code are from the offset amount $\phi_0$ to $\phi_0+(n-1)\Delta\phi$, may be interleaved for a plurality of times and integrated and an irradiation code g(t) may be generated. Even in this case, order of the unit codes can be set arbitrarily.

Figure 10:
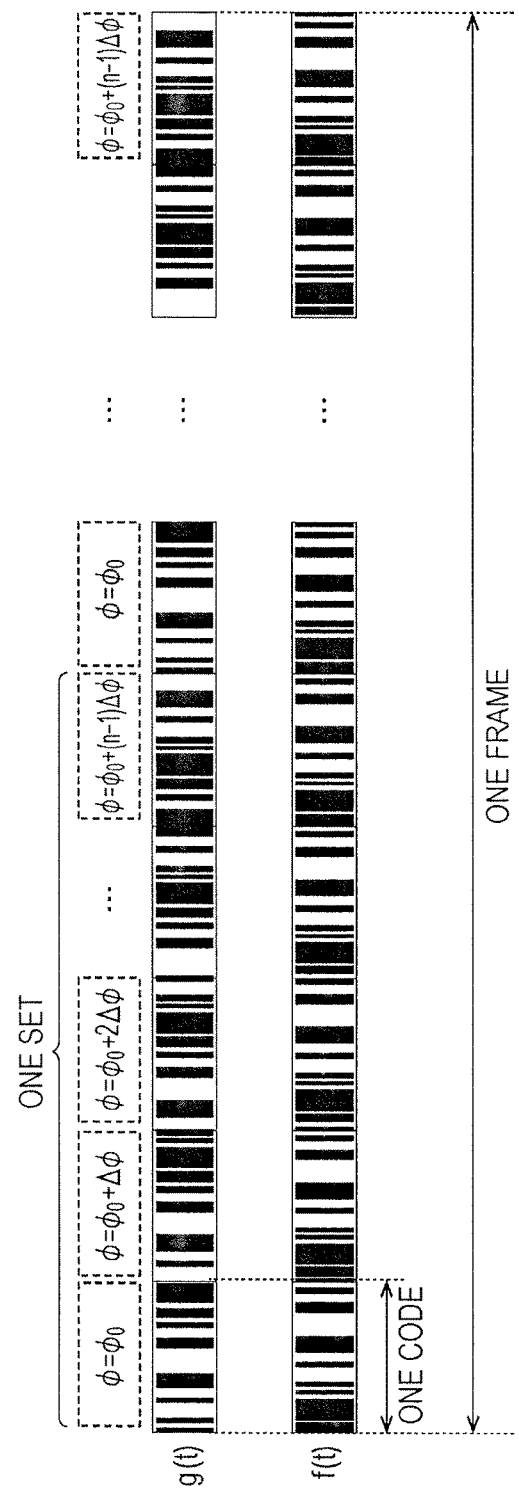
FIG. 10 is a view for describing a first method of generating an irradiation code by interleaving in a time direction.

For example, as illustrated in FIG. 10, with a code in which n unit codes having different phases are lined up in series as one set, a plurality of sets may be lined up in one frame.

Figure 11:
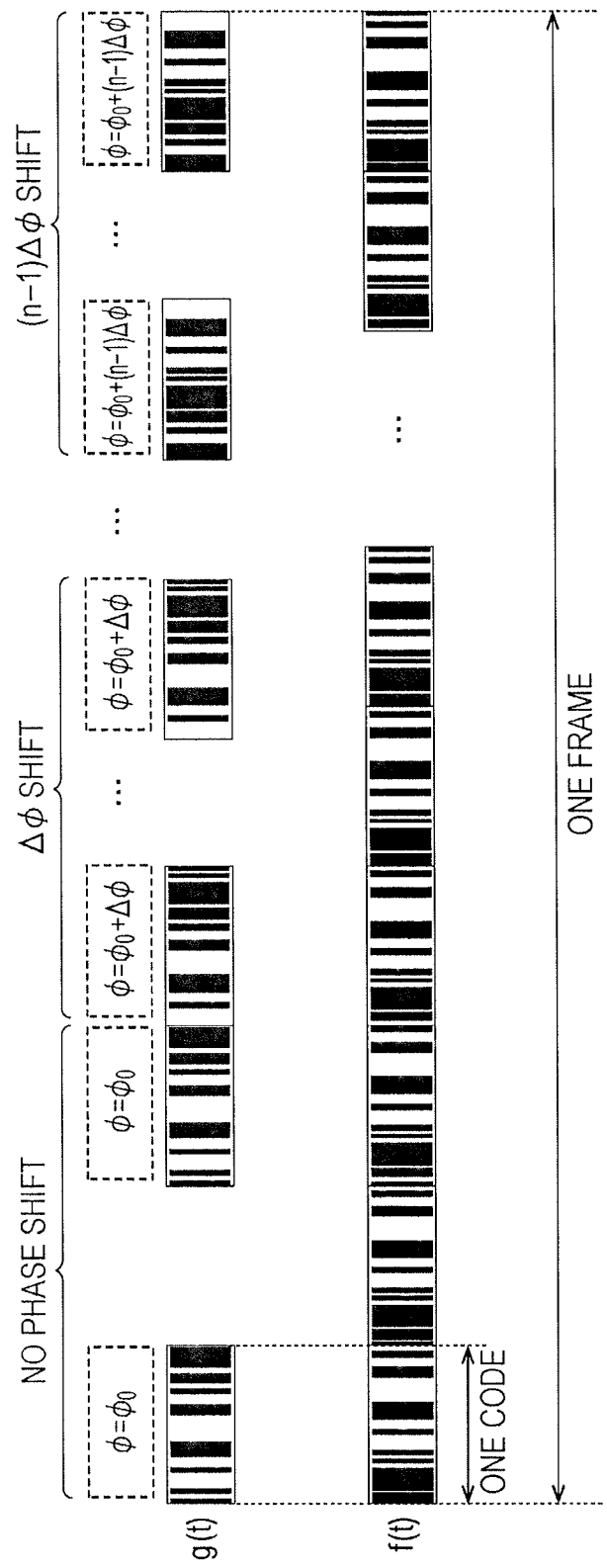
FIG. 11 is a view for describing a second method of generating an irradiation code by interleaving in a time direction.

Also, for example, as illustrated in FIG. 11, unit codes having the same phase may be lined up successively for one frame and the phase of the unit codes may be shifted. In this case, a place where a phase of the unit code is switched in one frame becomes the smallest.

Also, in the above description, each of the reference code f(t) and the irradiation code g(t) is a code including two values of 1 and 0. However, each of these codes may be a code including three or more values. Then, a value of the irradiation code g(t) may be changed according to a value of an actual code after superimposition. In this case, for example, intensity of the irradiation light is changed according to the value of the irradiation code g(t). Here, brightness of the light source 32 may be controlled according to the value of the irradiation code g(t) or a plurality of light source 32 may be provided and the number of light sources to be turned on may be controlled according to the value of the irradiation code g(t).

Moreover, in a case of providing a plurality of light sources 32, for example, the light sources 32 may be respectively made to correspond to unit codes having different phases and the light sources 32 may blink at the same time with the corresponding unit codes. Accordingly, as illustrated in FIG. 10 and FIG. 11, it becomes possible to superimpose a plurality of unit codes having different phases in the same time slot without interleaving the unit codes in a time direction.

2. MODIFICATION EXAMPLE

In the following, a modification example of the above-described embodiment of the present technology will be described.

In the above description, an example of superimposing unit codes having different phases and generating an irradiation code g(t) while fixing a phase of a reference code f(t) has been described. However, for example, it is possible to generate a reference code f(t) by superimposing unit codes having different phases while fixing a phase of an irradiation code g(t).

Also, for example, both of a reference code f(t) and an irradiation code g(t) may be generated by superimposition of unit codes having different phases.

Moreover, in the above description, an example of setting a basic code as a code identical to a reference code f(t) has been described. However, the two are not necessarily the same code as long as a condition of the above-described expression (5) is satisfied. Also, a code, which satisfies the condition of the above-described expression (5), other than an M-sequence may be used. That is, as a reference code f(t) and an irradiation code g(t), a combination of arbitrary codes which satisfy the condition of the above-described expression (5) and a cross-correlation between which is an impulse can be used. As such a code, there is a pseudorandom code other than the M-sequence, for example.

Also, in the above description, an example of making phase differences between unit codes identical has been described.

However, the phase differences between the unit codes are not necessarily identical.

Moreover, for example, it is possible to set two or more ROIs by designing a reference code f(t) and an irradiation code g(t) in such a manner as to generate two or more peaks in a graph of a cross-correlation coefficient between a reference signal and an irradiation signal. Accordingly, for example, it becomes possible to extract and photograph objects in a plurality of ROIs by a depth selection camera.

Also, a configuration example of the above-described imaging element 42 is just an example and an imaging element including an arbitrary configuration with which a pixel signal indicating a correlation between a reference signal and reception light can be output can be employed.

Moreover, for example, apart or a whole of a signal processing circuit 43 may be provided in an imaging element 42 or a part or a whole of a signal processing unit 108 of an imaging element 42 may be provided in a signal processing circuit 43.

3. USAGE EXAMPLE OF IMAGING DEVICE

Figure 12:
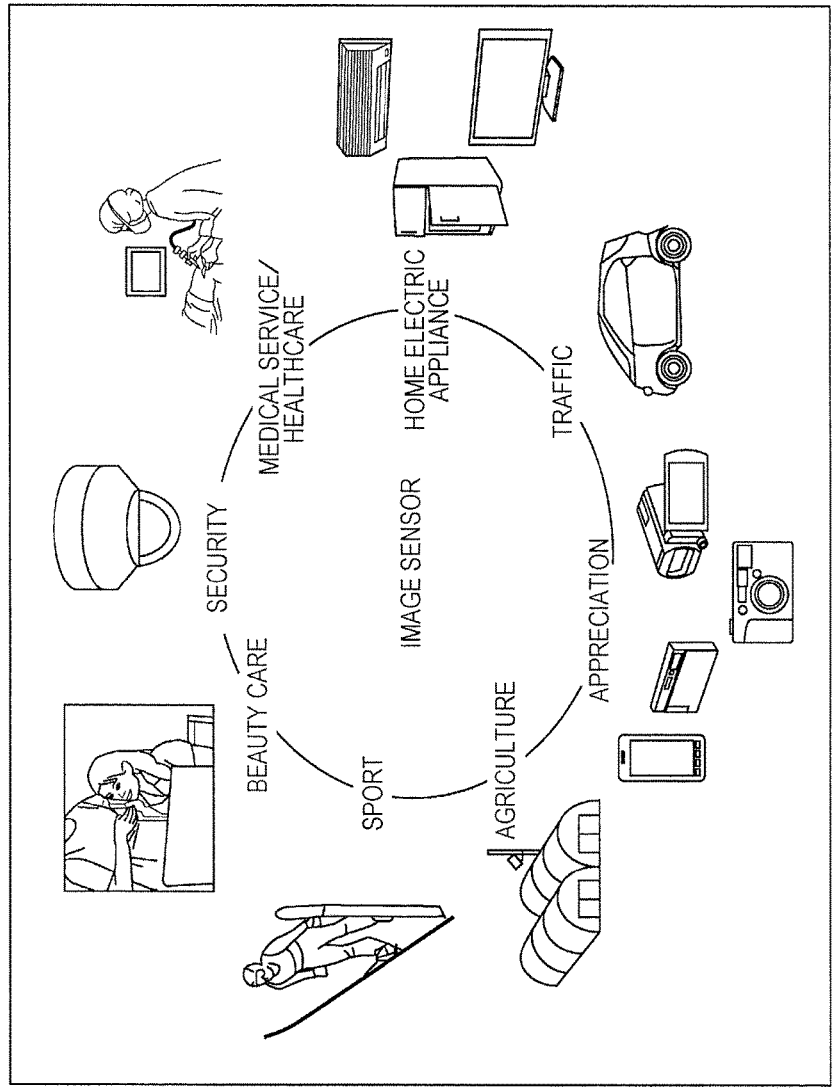
FIG. 12 is a view illustrating a usage example of the imaging device.

FIG. 12 is a view illustrating a usage example of the above-described imaging device 11.

As described in the following, the above-described imaging device 11 can be used in various cases of sensing light such as visible light, infrared light, ultraviolet light, or an X-ray.

A device of photographing an image which device is used for appreciation and is a digital camera, a mobile device with a camera function, or the like.

A device which is used for traffic and which is, for example, an in-vehicle sensor that photographs a front side, a back side, surroundings, or the inside of a car for safe driving such as automatic stopping or for recognition of a state of a driver, a monitoring camera that monitors a driving vehicle or a road, or a ranging sensor that measures a distance between vehicles.

A device used for a home electric appliance such as a TV, a refrigerator, or an air conditioner in order to photograph a gesture of a user and to perform a device operation corresponding to the gesture.

A device which is used for a medical service or a health care and which is, for example, an endoscope or a device that photographs a blood vessel by reception of infrared light.

A device which is used for security and which is, for example, a monitoring camera for crime prevention or a camera for recognizing a person.

A device which is used for a beauty care and which is, for example, a skin measuring instrument that photographs skin or a microscope that photographs a scalp.

A device which is used for a sport and which is, for example, an action camera or a wearable camera for a sport.

A device which is used for agriculture and which is, for example, a camera that monitors a state of a farm or a crop.

Note that an embodiment of the present technology is not limited to the above-described embodiment and various modifications can be made within the spirit and the scope of the present technology.

Note that the present technology may include the following configuration.

(1)

An imaging device including: a control unit configured to control an output of an irradiation signal including an irradiation code used for control of a pattern of emission of irradiation light and an output of a reference signal including a reference code indicating a pattern used for detection of a correlation with reception light including reflection light of the irradiation light; and an imaging element configured to output a pixel signal indicating a correlation between the reception light and the reference signal, wherein one of the irradiation code and the reference code is a code in which weighted adding of a plurality of unit codes, in which a phase of a basic code having an impulse cross-correlation with the other code is shifted for a different shift amount, is performed.

(2)

The imaging device according to (1), wherein the one code is a code in which the plurality of unit codes having a phase difference with equal intervals is added with the same weight.

(3)

The imaging device according to (2), wherein the control unit controls a range of a phase of the plurality of unit codes.

(4)

The imaging device according to (1), further including a signal processing unit configured to generate a range pixel signal, which is based on a distance to an object, for each pixel based on the pixel signal, wherein the control unit outputs, as the one code, a first superimposed code that is the plurality of unit codes which has a phase difference with equal intervals and which is added with weight decreased in a linear shape in a shift amount of a phase with respect to the basic code and a second superimposed code that is the plurality of unit codes added with weight increased in a linear shape in the shift amount of the phase with respect to the basic code, and the signal processing unit generates the range pixel signal based on a ratio of the pixel signal with respect to the first superimposed code and the pixel signal with respect to the second superimposed code.

(5)

The imaging device according to (4), wherein the control unit controls a range of a phase of the plurality of unit codes.

(6)

The imaging device according to (1), wherein the one code is a code that is a first unit code which is a basic code with a phase shifted for a first shift amount and to which a second unit code, which is a first unit code with a phase shifted for a second shift amount, is added with negative-weight.

(7)

The imaging device according to (6), wherein the control unit adds the second unit code with the negative-weight to the first unit code by adding a code that is a bit-inverted second unit code to the first unit code along with positive-weight having the same absolute value with the negative-weight.

(8)

The imaging device according to (6) or (7), wherein the control unit controls the first shift amount and the second shift amount.

(9)

The imaging device according to (1), wherein the one code is a code in which a first superimposed code that is a plurality of first unit codes which has a phase difference with equal intervals and which is added with positive-weight increased in a linear shape in a shift amount of a phase with respect to the basic code and a second superimposed code that is a plurality of second unit codes in which phases of the plurality of first unit codes are shifted for the same shift amount and which is added with negative-weight decreased in a linear shape in the shift amount of the phase with respect to the basic code are superimposed.

(10)

The imaging device according to (9), wherein the control unit generates the second superimposed code by adding codes, which are a plurality of bit-inverted second unit codes, with positive-weight having the same absolute value with the negative-weight.

(11)

The imaging device according to (9) or (10), wherein the control unit controls a range of a phase of the first unit codes and a shift amount of a phase between the first unit codes and the second unit codes.

(12)

The imaging device according to any one of (1) to (11), wherein the basic code is identical to the other code.

(13)

The imaging device according to (12), wherein the irradiation code and the reference code include M-sequences having the same value.

(14)

The imaging device according to any one of (1) to (13), wherein the one code is a code in which weighted adding is performed by lining up of the plurality of unit codes in a time direction.

(15)

The imaging device according to any one of (1) to (14), further including a lighting unit configured to emit the irradiation light.

(16)

An imaging control method including: controlling an output of an irradiation signal including an irradiation code used for control of a pattern of emission of irradiation light and an output of a reference signal including a reference code indicating a pattern used for detection of a correlation with reception light including reflection light of the irradiation light; outputting a pixel signal indicating a correlation between the reception light and the reference signal; and using, as one of the irradiation code and the reference code, a code in which weighted adding of a plurality of unit codes, in which a phase of a basic code having an impulse cross-correlation with the other code is shifted for a different shift amount, is performed.

REFERENCE SIGNS LIST

11 Imaging device
21 Lighting unit
22 Imaging unit
23 Control unit
31 Lighting control unit
32 Light source
42 Imaging element
43 Signal processing circuit
101 Pixel array unit
102 Vertical driving unit
103 Column processing unit
104 Horizontal driving unit
105 System control unit
108 Signal processing unit
161 Photoelectric conversion element
162a, 162b Transfer gate
163a, 163b FD
164a, 164b Reset transistor
165 Selection transistor
166a, 166b Amplifier transistor

The invention claimed is:

1. An imaging device comprising:
a control unit configured to control an output of an irradiation signal including an irradiation code used for control of a pattern of emission of irradiation light and an output of a reference signal including a reference code indicating a pattern used for detection of a correlation with reception light including reflection light of the irradiation light;
an imaging element configured to output a pixel signal indicating the correlation between the reception light and the reference signal; and
a single light source configured to emit the irradiation signal including the irradiation code,
wherein the irradiation code emitted by the single light source includes a plurality of unit codes, in which a phase of a basic code having an impulse cross-correlation with the reference code is shifted by a different shift amount, and weighted adding of the plurality of unit codes is performed by the control unit.

2. The imaging device according to claim 1, wherein the one code is a code in which the plurality of unit codes having a phase difference with equal intervals is added with the same weight.

3. The imaging device according to claim 2, wherein the control unit controls a range of a phase of the plurality of unit codes.

4. The imaging device according to claim 1, further comprising a signal processing unit configured to generate a range pixel signal, which is based on a distance to an object, for each pixel based on the pixel signal,
wherein the control unit outputs, as the one code, a first superimposed code that is the plurality of unit codes which has a phase difference with equal intervals and which is added with weight decreased in a linear shape and a second superimposed code that is the plurality of unit codes added with weight increased in a linear shape, and
the signal processing unit generates the range pixel signal based on a ratio of the pixel signal with respect to the first superimposed code and the pixel signal with respect to the second superimposed code.

5. The imaging device according to claim 4, wherein the control unit controls a range of a phase of the plurality of unit codes.

6. The imaging device according to claim 1, wherein the one code is a code that is a first unit code which is a basic code with a phase shifted for a first shift amount and to which a second unit code, which is a first unit code with a phase shifted for a second shift amount, is added with negative-weight.

7. The imaging device according to claim 6, wherein the control unit adds the second unit code with the negative-weight to the first unit code by adding a code that is a bit-inverted second unit code to the first unit code along with positive-weight having the same absolute value with the negative-weight.

8. The imaging device according to claim 6, wherein the control unit controls the first shift amount and the second shift amount.

9. The imaging device according to claim 1, wherein the one code is a code in which a first superimposed code that is a plurality of first unit codes which has a phase difference with equal intervals and which is added with positive-weight increased in a linear shape and a second superimposed code that is a plurality of second unit codes in which phases of the plurality of first unit codes are shifted for the same shift amount and which is added with negative-weight decreased in a linear shape are superimposed.

10. The imaging device according to claim 9, wherein the control unit generates the second superimposed code by adding codes, which are a plurality of bit-inverted second unit codes, with positive-weight having the same absolute value with the negative-weight.

11. The imaging device according to claim 9, wherein the control unit controls a range of a phase of the first unit codes and a shift amount of a phase between the first unit codes and the second unit codes.

12. The imaging device according to claim 1, wherein the basic code is identical to the other code.

13. The imaging device according to claim 12, wherein the irradiation code and the reference code include M-sequences having the same value.

14. The imaging device according to claim 1, wherein the one code is a code in which weighted adding is performed by lining up of the plurality of unit codes in a time direction.

15. An imaging control method comprising:
controlling an output, by a single light source, of an irradiation signal including an irradiation code used for control of a pattern of emission of irradiation light and an output of a reference signal including a reference code indicating a pattern used for detection of a correlation with reception light including reflection light of the irradiation light;
outputting, by an imaging element, a pixel signal indicating the correlation between the reception light and the reference signal; and
using, as the irradiation code emitted by the single light source, a code including a plurality of unit codes, in which a phase of a basic code having an impulse cross-correlation with the reference code is shifted a different shift amount, and weighted adding of the plurality of unit codes is performed by a control unit.

* * * * *